United States Patent
Arif Khan et al.

(10) Patent No.: US 11,386,193 B2
(45) Date of Patent: Jul. 12, 2022

(54) FRAMEWORK TO DESIGN COMPLETELY AUTOMATED REVERSE TURING TESTS

(71) Applicant: Dell Products L. P., Round Rock, TX (US)

(72) Inventors: Falaah Arif Khan, Hyderabad (IN); Hari Surender Sharma, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 190 days.

(21) Appl. No.: 16/828,520

(22) Filed: Mar. 24, 2020

(65) Prior Publication Data

US 2021/0264013 A1   Aug. 26, 2021

Related U.S. Application Data

(60) Provisional application No. 62/979,500, filed on Feb. 21, 2020.

(51) Int. Cl.
*G06F 21/36* (2013.01)
*G06F 21/45* (2013.01)

(52) U.S. Cl.
CPC .............. *G06F 21/36* (2013.01); *G06F 21/45* (2013.01); *G06F 2221/2133* (2013.01)

(58) Field of Classification Search
CPC ................................. G06F 21/36; G06F 21/45
USPC ......................................................... 726/18
See application file for complete search history.

(56) References Cited

U.S. PATENT DOCUMENTS

| | | | |
|---|---|---|---|
| 8,621,396 B1* | 12/2013 | Gossweiler, III | G06F 21/36 715/863 |
| 2008/0147456 A1* | 6/2008 | Broder | G06Q 30/0248 705/14.47 |
| 2010/0031330 A1* | 2/2010 | Von Ahn | G06F 21/36 726/5 |

(Continued)

OTHER PUBLICATIONS

Y. Javed, M. Nazir, M. M. Khan, S. A. Khayam and S. Li, "Captchæcker: Reconfigurable CAPTCHAs based on automated security and usability analysis", 2011, 4th Symposium on Configuration Analytics and Automation (SAFECONFIG), 2011, pp. 1-4, doi: 10.1109/SafeConfig.2011.6111665.*

*Primary Examiner* — Jacob Lipman
(74) *Attorney, Agent, or Firm* — Krishnendu Gupta; Deepika Bhayana; Derek Lam (57) ABSTRACT

Various systems and methods are provided for defining a CAPTCHA generator that is configured to generate CAPTCHA challenges by using at least a first parameter and a first plurality of values associated with the first parameter; defining an adversary program, where the adversary program is configured to automatically attempt to solve the CAPTCHA challenges; performing a first feedback loop that includes generating a first plurality of CAPTCHA challenges, receiving feedback from a group of human users and feedback from the adversary program; and using the feedback received from the human user and the feedback received from the adversary program to modify a weight associated with a first value among the plurality of values in order to generate future CAPTCHA challenges that create less inconvenience for human users but which are more difficult for adversary programs.

20 Claims, 5 Drawing Sheets

(56) References Cited

U.S. PATENT DOCUMENTS

2012/0246008 A1* 9/2012 Hamilton, II ...... G06Q 30/0241
705/14.66
2019/0018937 A1* 1/2019 Jadhav .................... G06F 21/31

* cited by examiner

FRAMEWORK TO DESIGN COMPLETELY AUTOMATED REVERSE TURING TESTS

CROSS-REFERENCE TO RELATED APPLICATION

This application claims the benefit of U.S. Provisional Patent Application No. 62/979,500, filed Feb. 21, 2020, which is incorporated by reference herein in its entirety.

BACKGROUND OF THE INVENTION

Field of the Invention

This disclosure generally relates to "Completely Automated Public Turing tests to tell Computers and Humans Apart," more commonly known as "CAPTCHAs," and more specifically relates to a framework for designing and implementing completed automated CAPTCHA designs that are able to automatically modify their difficulty with respect to both human users and adversarial computer programs.

Description of the Related Art

In the digital age in which we live, websites often have the need to distinguish human users from automated adversary programs (or other malicious software), the latter of which may be attempting to manipulate the website or perform nefarious or undesirable actions in relation thereto. Schemes exist that can be used to help a website distinguish between human users and adversarial programs in such situations. However, as this world grows more technologically advanced and complex, the capabilities of what computer programs can do has been increasing quite rapidly. As such, any functionality that is to be effectively used to prevent (or at least minimize) adversarial computer programs from pretending to be human users with any meaningful degree of success must take into account the growing abilities of computer programs, and should ideally provide for the functionality to be automatically modified in real time and on the fly in response to the latest round of performance data with respect to the interactions of both human users and adversarial programs with that functionality.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

This disclosure generally includes methods, computer program products, computer systems, and the like, that provide for defining a CAPTCHA generator that is configured to generate CAPTCHA challenges by using at least a first parameter and a first plurality of values associated with the first parameter; defining an adversary program, where the adversary program is configured to automatically attempt to solve the CAPTCHA challenges; performing a first feedback loop that includes generating a first plurality of CAPTCHA challenges, receiving feedback from a group of human users and feedback from the adversary program; and using the feedback received from the human user and the feedback received from the adversary program to modify a weight associated with a first value among the plurality of values in order to generate future CAPTCHA challenges that create less inconvenience for human users but which are more difficult for adversary programs.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

A "Completely Automated Public Turing test to tell Computers and Humans Apart," more commonly known as a "CAPTCHA," can be used by websites to prevent computers from pretending to be real people and in so doing maliciously or deceptively gaining access to a website or portion thereof. A "Turing test" can be thought of as a test of a machine's ability to exhibit intelligent behavior similar to that of a human. A CAPTCHA is an automated form of a Turing test and can be used to tell humans and computers apart, such as when attempting to access a website or portion thereof, among other such possibilities.

Although CAPTCHA tests are often highly effective in preventing computers from imitating humans (and other such malicious behavior), these tests are not perfect, and are known to suffer from at least a few major faults and other concerns. One such issue is that when a given CAPTCHA design is easily solvable by humans, adversarial computers can fairly easily be programmed to also solve that CAPTCHA design, which of course largely defeats the purpose of using a CAPTCHA test in the first place. This is especially true as our society gets more technologically advanced, and the capabilities of what computer programs can do increase. As such, any good CAPTCHA design must take into account the growing abilities of computer programs (and particularly those computer programs that are designed to operate in an adversarial, nefarious, and/or malicious manner in order to defeat CAPTCHAs).

At the same time, when attempting to define a CAPTCHA design that is too difficult for adversarial computer programs to solve, care must be taken to avoid creating a CAPTCHA design that is also too inconvenient and/or difficult for many humans to solve. Indeed, defining a CAPTCHA design with such a high level of difficulty (such as when characters are confusing, overly skewed or blurred, and/or indistinguishable from other similar characters even to an average human) would largely prevent adversarial computing programs from beating the CAPTCHA, but may also prevent many humans from correctly solving CAPTCHA tests generated by the same CAPTCHA design (or configuration). This reduced ability for humans to solve CAPTCHAs generated by a given CAPTCHA design can cause negative consequences (financially, and otherwise) for various websites (such as, e.g., e-commerce websites) by causing humans to abandon orders (or other processes) due to frustration with an overly-difficult CAPTCHA challenge.

In other words, a good CAPTCHA design should result in CAPTCHA challenges that are easy for humans to solve quickly and with a high degree of accuracy and success, while simultaneously being hard (if not impossible) for adversarial computers (and adversarial computer programs) to solve. New CAPTCHA schemes and/or designs are often defined with this dual goal in mind. Nevertheless, as each new CAPTCHA scheme and/or design hits the market, the market inevitably develops new techniques to break, solve, or otherwise circumvent each new CAPTCHA scheme and/ or design. Engineers must then create a new and more secure CAPTCHA design, which, upon deployment and subsequent use, results in the market once again attempting to design adversarial programs that can solve challenges generated from that CAPTCHA design. This arduous cycle of designing, breaking, and then redesigning various CAPTCHA designs in order to strengthen against subsequent breaking, has become the de-facto lifecycle of a secure CAPTCHA design, and is a less than ideal result.

This disclosure generally includes methods, computer program products, computer systems, and the like, that provide for defining a CAPTCHA generator that is configured to generate CAPTCHA challenges by using at least a first parameter and a first plurality of values associated with the first parameter; defining an adversary program, where the adversary program is configured to automatically attempt to solve the CAPTCHA challenges; performing a first feedback loop that includes generating a first plurality of CAPTCHA challenges, receiving feedback from a group of human users and feedback from the adversary program; and using the feedback received from the human user and the feedback received from the adversary program to modify a weight associated with a first value among the plurality of values in order to generate future CAPTCHA challenges that create less inconvenience for human users but which are more difficult for adversary programs.

Figure 1A:
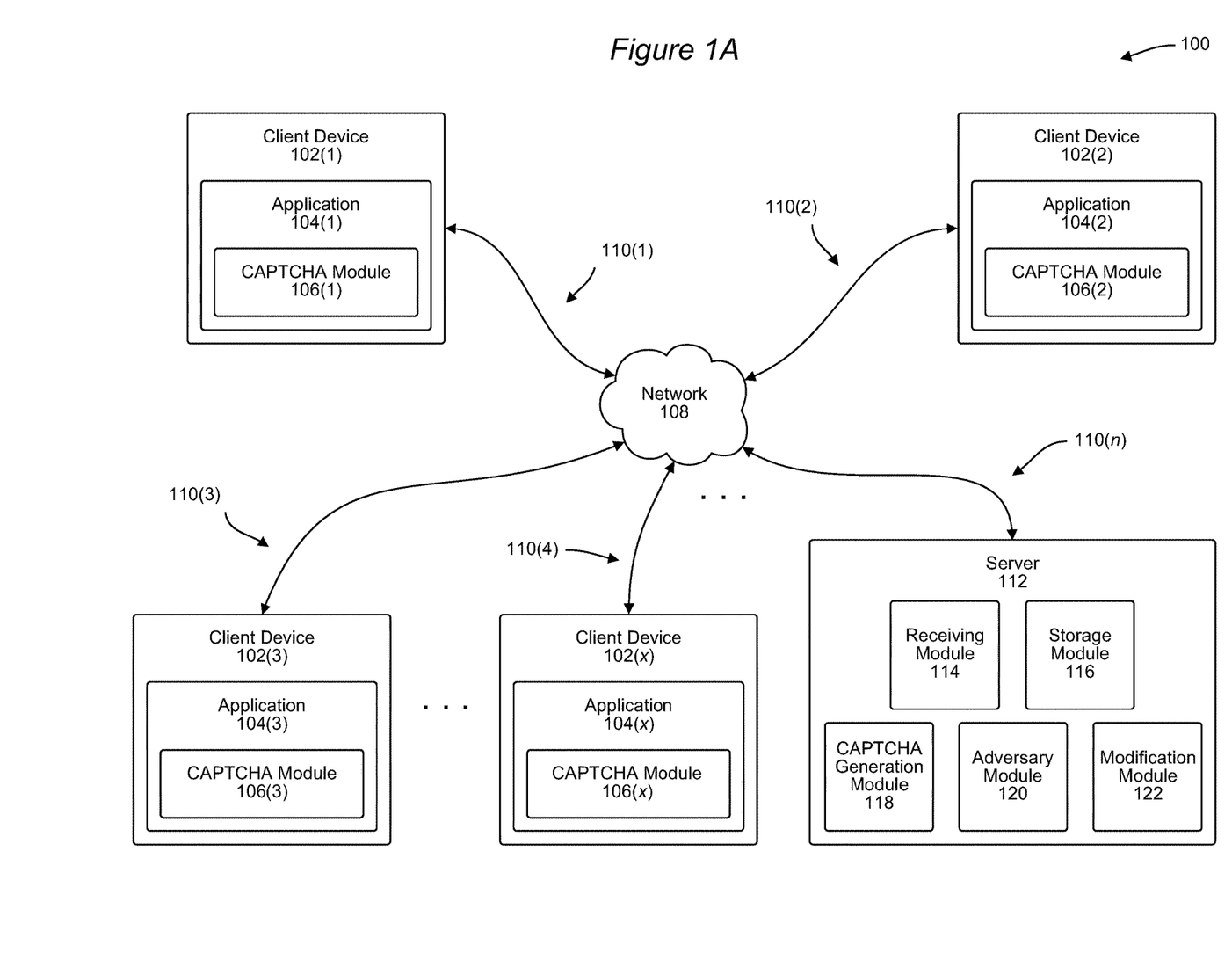
FIG. 1A is a block diagram depicting an example computing environment, according to one embodiment of this disclosure.

FIG. 1A illustrates a block diagram of an example computing environment 100 that includes a plurality of client devices 102(1)-102(x) (collectively, "client device(s) 102"). Each client device 102 can be any computing device, such as a personal computer, laptop computer, notebook computer, personal computing device (e.g., a smart phone), or any other computing device as described herein. Although not expressly shown in FIG. 1A, each client device 102 can also include various hardware and software components, such as a microprocessor, memory, a display screen, networking capabilities, an operating system, one or more applications, and so forth.

Each client device 102 is also configured to execute an application, such as, e.g., applications 104(1)-104(x) (collectively, "application(s) 104"). Each application 104 is a computer program, component or module of a computer program (collectively, "computer program"), or another form of computer code (e.g., a webpage), and which can be configured to perform various aspects of the functionality described herein. In certain embodiments, each application 104 can be a web browser or similar functionality, such as is capable of loading a webpage including a CAPTCHA module (or other such CAPTCHA functionality), such as CAPTCHA modules 106(1)-106(x) (collectively, "CAPTCHA module(s) 106"). (As the reader will appreciate, CAPTCHA is an acronym for a "Completely Automated Public Turing test to tell Computers and Humans Apart," with the capitalized letters in the forgoing quotation corresponding to the letters used in the term CAPTCHA. A "Turing test" can be thought of as a test of a machine's ability to exhibit intelligent behavior similar to that of a human. As noted above, a CAPTCHA is an automated form of a Turing test and can be used to tell humans and computers apart, such as when attempting to access a website or portion thereof, among other such possibilities.) In other embodiments, one or more of applications 104 can be another form of software that is configured to perform various aspects of the functionality described herein. In certain embodiments, each CAPTCHA module 106 can take the form of a software module or other software component that is configured to perform certain aspects of the functionality described herein. As will be discussed in more detail below, examples of such functionality include, e.g., the ability to display or otherwise present CAPTCHA images to a user, receive input (such as, e.g., from a user or computer program) in response to that CAPTCHA, process that input and determine if the CAPTCHA was correctly "solved," provide responsive output indicating whether the CAPTCHA was correctly solved, and transmit information related to the CAPTCHA to other system components as necessary, among other functionality.

As also shown in FIG. 1A, each client device 102 is connected to a network 108 via one of connections 110(1)-110(n) (collectively, "connection(s) 110"). Network 108 can be any sort of network, including a local area network ("LAN"), wide area network ("WAN"), storage area network ("SAN"), the Internet, an intranet, and so forth. Each of the connections 110 can be any sort of wired and/or wireless network connection, such as an Ethernet connection, a Fiber Optic connection, a BLUETOOTH connection, and so forth, including various combinations of the foregoing technologies. Although only one network 108 is depicted in FIG. 1A, in practice more or less instances of network 108 can be used. Similarly, although only a certain number of connections 110 are depicted in FIG. 1A, in practice more or less instances of connection(s) 110 can be used.

As used throughout this disclosure, the reader will appreciate that letters such as n and x (and other such letters) is/are used to indicate a variable number of devices or components. Although such letters are used in describing a variable number of instances of each of these different devices and components, a repeated use of a given letter (e.g., n) does not necessarily indicate that each device and component has a same number (e.g., n) of instances implemented in the example system discussed herein, or in any other embodiment of this invention.

Through the various connections and networks, each client device 102 shown in FIG. 1A is ultimately connected to a server, such as, e.g., server 112. Server 112 can be any computing device, such as a personal computer, laptop computer, notebook computer, server, or any other computing device that is capable of performing various aspects of the functionality described herein, including, e.g., analyzing various information related to CAPTCHA designs and suggesting improvements thereto, among other such functionality. Although not expressly shown in FIG. 1A, server 112 can also include other components that are necessary for its functionality, such as a microprocessor, memory, networking capabilities, and so forth. Although only a single server 112 is depicted in FIG. 1A, in practice more than one server can be used, and the components and/or functionality of server 112 can be divided among multiple such servers.

As can be seen from FIG. 1A, server 112 is configured to execute various software modules, such as, e.g., Receiving Module 114, Storage Module 116, CAPTCHA Generation Module 118, Adversary Module 120, and Modification Module 122. Receiving Module 114 can be a hardware and/or software module configured to perform various aspects of the functionality described herein. In certain embodiments, Receiving Module 114 is configured to receive information (such as, e.g., information about CAPTCHA tests), such as can be sent by a client device 102 and/or component thereof. Storage Module 116 can be a hardware and/or software module configured to perform various aspects of the functionality described herein. In certain embodiments, Storage Module 116 is configured to store (and provide access to) various information (such as, e.g., information about CAPTCHA tests), such as can be received by Receiving Module 114 or another component of server 112. CAPTCHA Generation Module 118 can be a hardware and/or software module configured to perform various aspects of the functionality described herein. In certain embodiments, CAPTCHA Generation Module 118 is configured to define various CAPTCHA schemes, and generate and execute individual CAPTCHA tests consistent with such CAPTCHA schemes, as will be described in more detail below. Adversary Module 120 can be a hardware and/or software module configured to perform various aspects of the functionality described herein. In certain embodiments, Adversary Module 120 is configured to store and execute various adversary programs, which will be described in more detail below, and can generally be thought of as automated software programs that can be configured to attempt to "solve" CAPTCHA tests. Modification Module 122 can be a hardware and/or software module configured to perform various aspects of the functionality described herein. In certain embodiments, Modification Module 122 is configured to process and analyze information related to CAPTCHA tests in order to modify the distribution (or weights) of parameter values (e.g., to weight certain possible values for each parameter more or less heavily than other possible values for that same parameter, in order to achieve the goals discussed elsewhere herein) for use when generating future CAPTCHA tests, such as will be described in more detail below. In other embodiments, each of these modules can perform more, less, and/or other features and functionality as well.

Moreover, although one specific configuration is shown in FIG. 1A, many other configurations of system 100 are possible. For instance, although a certain number of client devices 102 (and their associated components) are depicted in FIG. 1A, in practice this invention can be used with more of less client devices 102. Likewise, more or less networks 108, network connections 110, and servers 112 are possible, and more, less, or different modules can be used on server 112, or otherwise. Other configurations are possible as well.

Figure 1B:
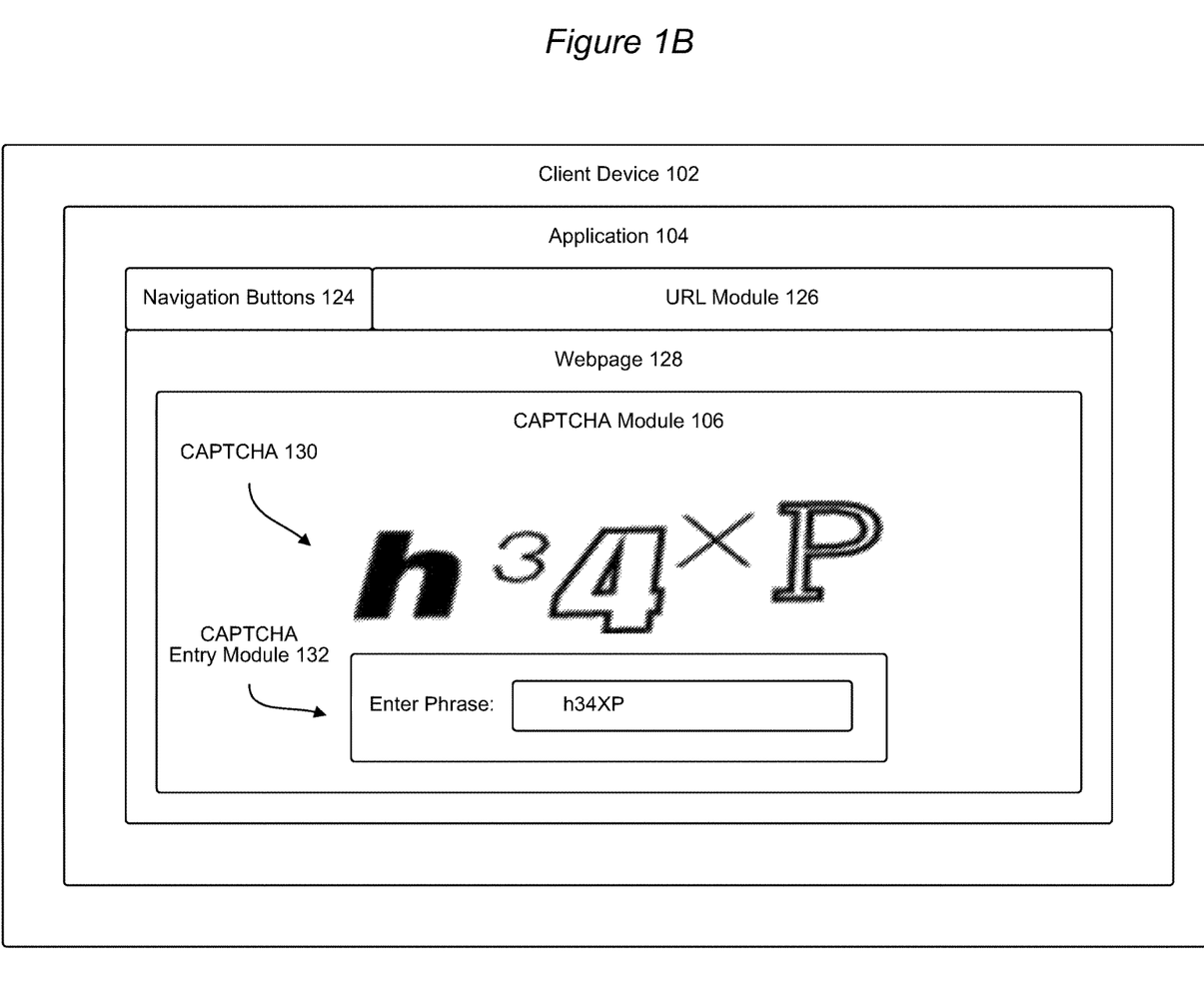
FIG. 1B is a block diagram depicting an example user interface including a CAPTCHA challenge, according to one embodiment of this disclosure.

FIG. 1B illustrates a block diagram of an example user interface that includes an example CAPTCHA challenge. As such, FIG. 1B generally depicts enhanced details of a client device 102, including the associated application 104 and CAPTCHA Module 106. In the example shown in FIG. 1B, the reader can assume that Application 104 is a web browser. In the example embodiment shown in FIG. 1B, Application 104 includes Navigation Buttons 124, which can be any buttons that may be included in a web browser, such as Back, Forward, Refresh, and Home buttons. Application 104 also includes URL Module 126, which can be the standard Uniform Resource Locator ("URL") address bar commonly included in many web browsers. Application 104 also includes Webpage 128, which can be any webpage that is configured to include a CAPTCHA Module, such as CAPTCHA Module 106. In the example embodiment shown in FIG. 1B, CAPTCHA Module 106 includes a CAPTCHA challenge (e.g., CAPTCHA 130) and a CAPTCHA Entry Module (e.g., CAPTCHA Entry Module 132). CAPTCHA 130 is a CAPTCHA image, such as could be generated by the functionality described herein, which functionality will be discussed in more detail below. CAPTCHA Entry Module 132 can be any functionality that can be used by a human user and/or adversary computer program to input a solution to CAPTCHA 130. In the example embodiment shown in FIG. 1B, CAPTCHA Entry Module 132 includes instructional text ("Enter Phrase:"), a text box in which a human user and/or adversary computer program can input a solution, and the solution phrase ("h34XP") as entered by a human user or an adversary computer program. In other embodiments, other functionality can also be included in the CAPTCHA Entry Module 132, such as, e.g., a Submit button, which can be used to submit the entered solution phrase; and/or a Refresh button, which can be used to request a new CAPTCHA image without having to refresh the entire webpage (which can be problematic on certain e-commerce websites, for example).

Figure 2:
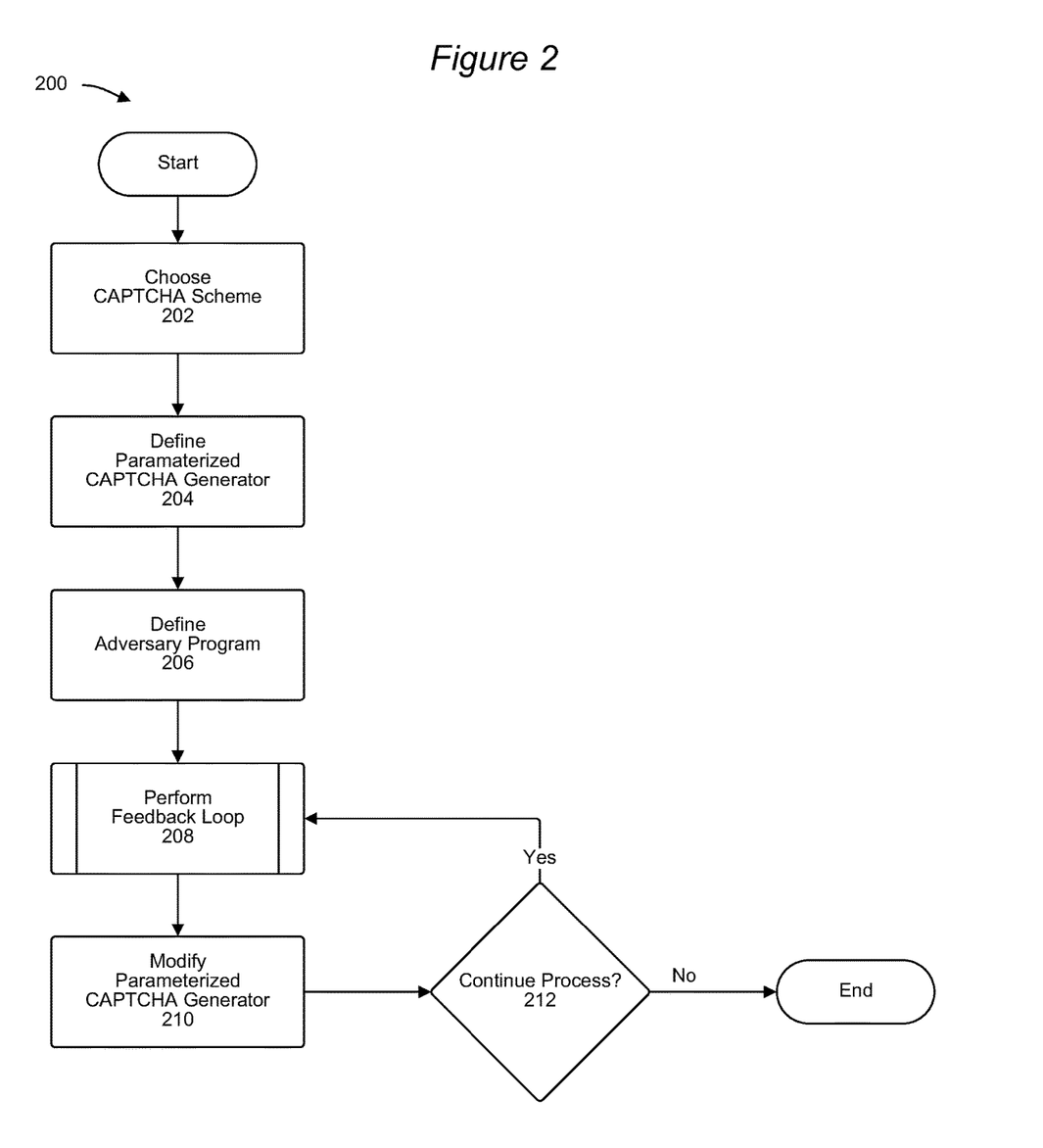
FIG. 2 is a flowchart for performing various steps of a process to define, test, and modify a CAPTCHA configuration and to perform related functionality, according to one embodiment of this disclosure.
Figure 3:
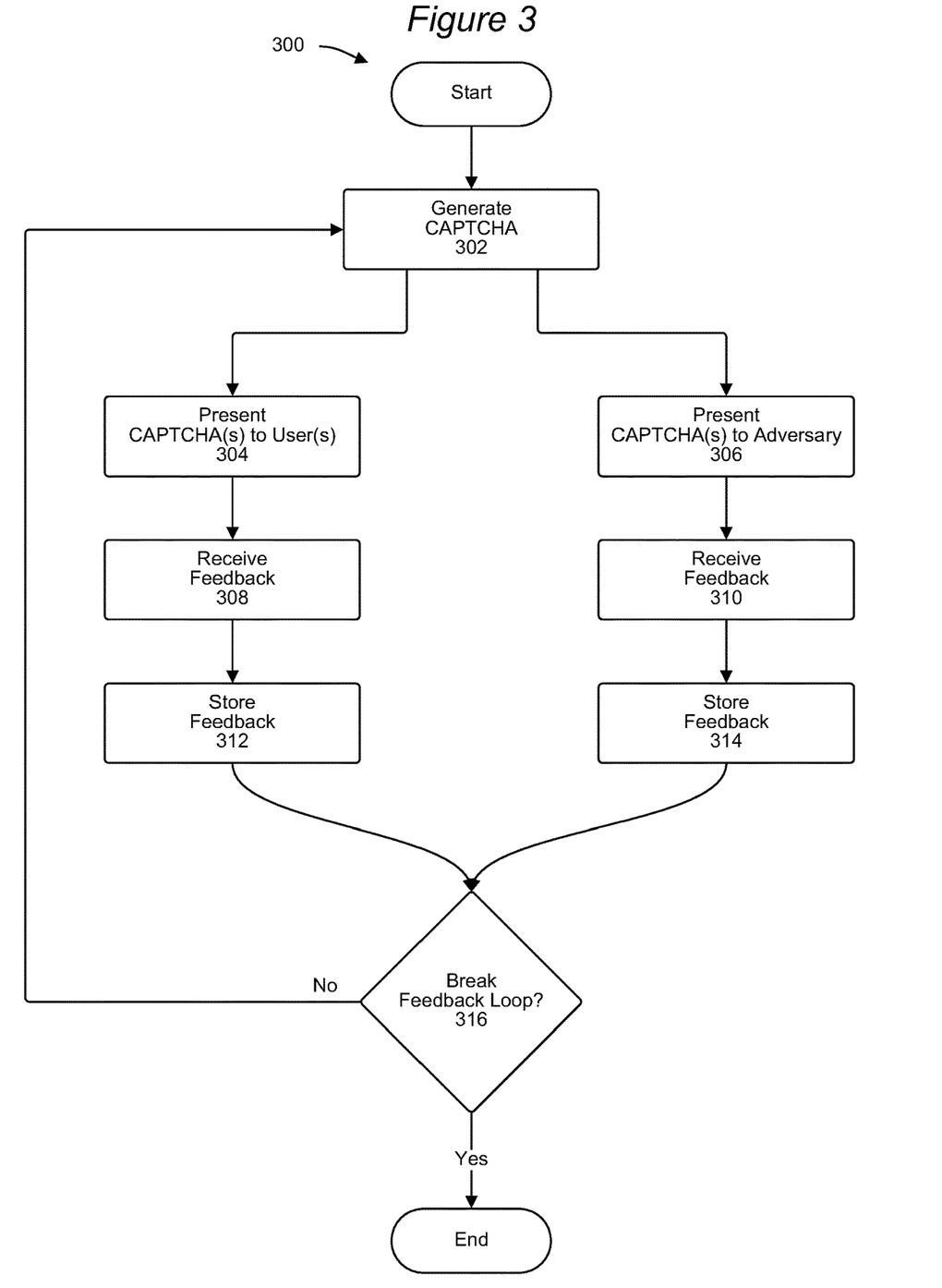
FIG. 3 is a flowchart for performing various steps of a process to perform a feedback loop to gather feedback information about a given CAPTCHA configuration, according to one embodiment of this disclosure.
Figure 4:
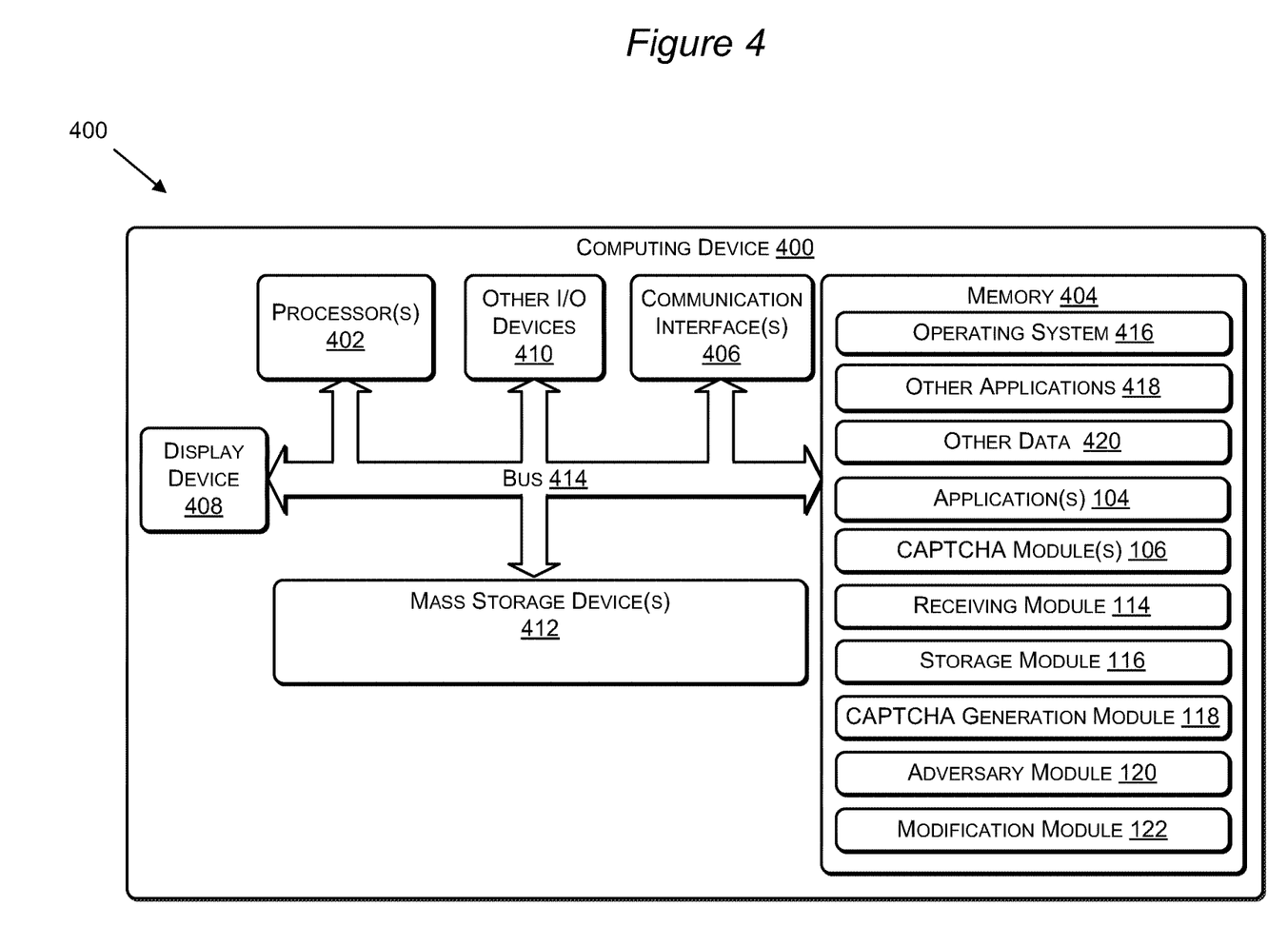
FIG. 4 illustrates an example configuration of a computing device that can be used to implement the systems and techniques described herein.

FIGS. 2, 3, and 4 collectively illustrate various actions generally pertaining to the functionality disclosed herein, such as, e.g., choosing a CAPTCHA scheme; defining a parameterized CAPTCHA Generator for use in generating individual CAPTCHA tests consistent with the chosen CAPTCHA scheme, which is done in part by using a customized CAPTCHA configuration (which may alternatively be referred to as CAPTCHA design herein); defining an adversary program that can be used to test the customized CAPTCHA configuration; performing a feedback loop in order to test, and receive feedback and other such information about, the customized CAPTCHA configuration with respect to both humans users and the adversary program; modifying the distribution (or weights) of parameter values for use in generating future CAPTCHA tests, which modification is performed in light of the feedback received during the feedback loop and is performed with the goals discussed elsewhere herein being in view (e.g., minimizing human difficulty and/or inconvenience such as by maximizing the success rate (e.g., how often humans correctly solves CAPTCHA challenges, and/or how often humans correctly solve CAPTCHA challenges without refreshing any CAPTCHA challenges in the process), and minimizing the success rate of adversary programs. In slightly more detail, FIG. 2 provides an overview of such functionality, and FIGS. 3 and 4 provide enhanced details of various steps depicted in FIG. 2. As will be appreciated in light of the present disclosure, each of these methods may be modified in order to derive alternative embodiments. Moreover, although the steps in the embodiments of these methods that are discussed herein are shown in a sequential order, certain steps may occur in a different order than shown, certain steps may be performed concurrently, certain steps may be combined with other steps, and certain steps may be omitted in another embodiment. For discussion purposes, methods 200 and 300 are described with reference to elements such as those described in connection with FIG. 1A and FIG. 1B, as described above, although other models, frameworks, systems, and environments may be used to implement these processes. In the flow diagram included in each of these figures, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes.

Turning now to FIG. 2, FIG. 2 is a flowchart of a method 200 illustrating various actions performed in connection with one embodiment of the systems and techniques disclosed herein. For discussion purposes, the process 200 is described with reference to elements such as those described in connection with FIG. 1A and FIG. 1B as described herein, although other models, frameworks, systems and environments may be used to implement these processes. To provide more detail, FIG. 2 is a flowchart of a process 200 that illustrates various actions that can be performed in conjunction with this disclosure, such as can generally be viewed, e.g., from the perspective of a server (such as, e.g., server 112) and/or a module or other component thereof (such as, e.g., Receiving Module 114, Storage Module 116, CAPTCHA Generation Module 118, Adversary Module 120, and/or Modification Module 122). In certain embodiments, however, process 200 may be performed by any computing device as described herein, and process 200 may also be performed in conjunction with one or more steps of one or more other processes described herein, such as method 300, which provides enhanced details of a portion of method 200.

To provide more detail, FIG. 2 is a flowchart of a process 200 that includes various actions that can be performed to define, test, and modify a CAPTCHA design (or configuration), and various functionality related thereto. As the reader will appreciate, FIG. 2 and method 200 provide an overview of the functionality disclosed herein for defining, testing, and modifying CAPTCHA designs and for performing various functionality related thereto, with certain of the details of FIG. 2 and method 200 being fleshed out in more detail in FIGS. 3 and 4 (and their related methods), in the discussion provided elsewhere herein. In one embodiment, process 200 (as well as process 300) may be performed by a computing device (such as, e.g., server 112, and/or a module or other component thereof) as described herein, and process 200 (as well as process 300) may also be performed in conjunction with one or more steps of method 300.

In one embodiment, method 200 begins at 202, where a CAPTCHA scheme is chosen. CAPTCHA schemes can generally take various forms, such as, e.g., character-based CAPTCHA schemes (an example of which is shown in FIG. 1B), image-based CAPTCHA schemes, reCAPTCHA schemes, among other possibilities (such as, e.g., using a "selfie" or other personal photo as a CAPTCHA). In certain embodiments, the CAPTCHA scheme to be used may be chosen automatically by a computing device from among one or more possible CAPTCHA schemes. In other embodiments, the CAPTCHA scheme to be used may be chosen by a website designer, website administrator, or other human (possibly while operating a computing device) from among one or more possible CAPTCHA schemes. The examples provided in the instant disclosure will focus primarily on character-based CAPTCHA schemes (or "character CAPTCHAs," for short), which will be treated as the CAPTCHA scheme chosen in 202, although the general functionality disclosed herein could also be used in conjunction with other types of CAPTCHA schemes.

In 204, a parameterized CAPTCHA Generator is defined for use in generating each individual CAPTCHA test. A parameterized CAPTCHA Generator (or "CAPTCHA Generator," for short) can be a computer program, software module, or portion thereof, which is configured to use various parameter-value pairings (such as are described elsewhere herein) to generate a CAPTCHA challenge (in a manner that is described elsewhere herein). In certain embodiments, a CAPTCHA Generator (such as, e.g., CAPTCHA Generation Module 118) can perform all or part of this functionality. For instance, a character-based CAPTCHA test can consist of a group of letters, numbers, and/or other characters. Unlike plain text strings, however, the characters used in a CAPTCHA are typically distorted or altered in some manner, which is done, at least in part, to make it more difficult for an adversarial computer program to correctly read, interpret, and "solve" the CAPTCHA. The selection of the characters to include in any given CAPTCHA test, along with the presentation and distortion of those characters, can be performed by a CAPTCHA Generator (such as, e.g., CAPTCHA Generation Module 118) operating on a set of defined parameters, e.g., a set of parameters that are each defined by a set of one or more available values. For instance, in certain embodiments, the parameters to be used in generating a CAPTCHA can include parameters such as a character set (e.g., one or more of the letters A-Z in upper and/or lowercase; one or more of the digits 0-9; and/or one or more other characters that are present on a common English-language keyboard, such as, e.g., !, @, #, $, %, and so forth), a font type (e.g., Times New Roman, Courier New, Calibri, Garamond, and so forth), a font size (which determines the size of the characters, and can include a range of distinct font sizes (or, one or more distinct font sizes) that are available for use in generating any given CAPTCHA and/or component character thereof), an x-offset value (which can be used to determine the overlap between the characters, and can include a range of values (or, one or more distinct values) that are available for use in generating any given CAPTCHA and/or component character thereof), a y-offset value (which can be used to determine the vertical placement of each character (such as, e.g., as an offset from a baseline), and can include a range of values (or, one or more distinct values) that are available for use in generating a given CAPTCHA test and/or component character thereof), a value indicating whether a given character should be hollow or solid (which can take the form of a binary value or other number (such as, e.g., 0 for solid, and 1 for hollow), a Boolean value (such as, e.g., TRUE for hollow, and FALSE for solid), or a string value (such as, e.g., "H" and "S," "Hollow" and "Solid," and so forth), among other options), a string length variable (e.g., a number indicating the number of characters that should be included in any given CAPTCHA test), and one or more coordinates (or other values) indicating the degree to which a given character within the CAPTCHA string should be skewed (e.g., slanted), among other possible parameters and values. One example set of such parameters and parameter values can be seen in the table below (the manner in which this information is used to generate a CAPTCHA string will be discussed in more detail in accordance with 302, below):

| Type | Parameter | Available/Valid Parameter Values | Description |
|---|---|---|---|
| Character Level | Character Set | [a-z], [A-Z], [0-9] | Selection of individual characters in CAPTCHA string |
| Character Level | Font Type | [Font Type 1, Font Type 2, Font Type 3, . . . Font Type 10] | Determines the custom font used to draw the character |
| Character Level | Font Size | [40, 80] | Determines the size of the character |
| Character Level | X-Offset | [−5, 10] | Determines the overlap between characters |
| Character Level | Y-Offset | [40, 60] | Determines the placement of the character vertically |
| Character Level | isHollow | [0, 1] (0 = Solid, and 1 = Hollow) | Determines whether the character will be drawn as a hollow or solid character |
| Image Level | CAPTCHA string length | 5-7 | Determines the number of characters to be included in the CAPTCHA string |
| Image Level | Skew Points | | Coordinates of the destination rectangle on which the image needs to be transformed (skewed) |

In certain embodiments, these parameters and their associated values can be saved in a table, such as, e.g., a database table, spreadsheet, and so forth. In certain embodiments, such a table can include a column for each parameter, and a row corresponding to each CAPTCHA configuration that has been tested thus far. For each row (representing a configuration), the cell corresponding to any given parameter can include a list of paired values, where the first value in the pair is a possible value from among the acceptable values for each configurable parameter, and the second value in the pair is a weight, proportion of the total, or other coefficient (collectively, "weight") that is presently assigned to the associated configurable value in that particular CAPTCHA configuration. As such, these paired values can be thought of as value-weight pairs. For instance, in the example of configurable parameters provided above, the initial set of parameters indicates that the CAPTCHA string length can be 5, 6, or 7. As such, the initial set of paired values for that parameter can be represented as {"5," 1, "6," 1, "7," 1}, where the numbers in quotations are the possible values of that parameter, and each of the paired values (which are the number 1 in every case in this example) represents the weight given to that value in this configuration. As another example, in the example of configurable parameters provided above, the initial set of parameters indicates that the isHollow variable can be 0 (isHollow=false, meaning that the character should be solid) or 1 (isHollow=true, meaning that the character is hollow). As such, the initial set of paired values for that parameter can be represented as {"0," 1, "1," 1}, where the numbers in quotations are the possible values of that parameter, and each of the paired values (which are the number 1 in every case in this example) represents the weight given to that value in this configuration. These weights (either in their initial form, or as modified such as in the manner discussed below) can then be used by a CAPTCHA Generator (such as, e.g., CAPTCHA Generation Module 122) to generate CAPTCHA challenges, the generation of which will be discussed in more detail below.

As will also be discussed in more detail below, the initial weight associated with each possible value of each configurable parameter can be changed (via the performance of the methods and functionality discussed elsewhere herein) to other values that are greater than or equal to zero (with zero indicating that the associated value should no longer be used in generating CAPTCHA tests in this configuration). These changes will result in a modified CAPTCHA configuration, which can then be used to generate future CAPTCHA challenges that are easier for a human user to solve and/or more difficult for an adversary computer program (such as is discussed in more detail starting in the following paragraph) to solve, and which thus help achieve the goals described herein.

In 206, an adversary computer program (or "adversary," for short) is defined. An adversary is software that is configured to attempt to automatically (i.e., without requiring human interaction) solve any given CAPTCHA configuration (e.g., the combination of a CAPTCHA scheme and the parameters and associated values related thereto). For instance, in certain embodiments, an adversary program may generally work by attempting to segment a given CAPTCHA test into the component characters thereof, and then using Optical Character Recognition ("OCR") and other functionality to attempt to "solve" the CAPTCHA by determining what actual character is represented by each component character in the CAPTCHA test. In certain embodiments, an adversary can be defined and/or customized in order to maximize the adversary's effectiveness against a given, specific CAPTCHA configuration. In other embodiments, a more generalized adversary can be used. In certain embodiments, an adversary can be purchased from a third-party. In other embodiments, an adversary can be designed in-house by the entity making use of the techniques described herein. The specific manner in which adversary programs are designed is beyond the scope of this disclosure, but for the sake of 206 (and the functionality generally disclosed herein), an adversary should be chosen in a manner that allows for interoperability with the disclosure provided herein, and preferably should be chosen so as to provide a substantially-high likelihood of success against any given CAPTCHA configuration.

In 208, method 200 performs a feedback loop to test the CAPTCHA configuration with respect to both human users and the adversary program, and to gather feedback regarding how well the human users and the adversary program respectively were able to solve the CAPTCHAs being generated according to the CAPTCHA configuration. The manner in which this feedback loop works will be discussed in more detail in the discussion below regarding FIG. 3 and method 300, which provide enhanced details of 208. In short, however, the purpose of this feedback loop is to generate CAPTCHAs (according to the CAPTCHA configuration defined in 202 and 204, above) and present those CAPTCHAs to human users and the adversary program (defined or otherwise selected in 206), and then capture data regarding how well each group was able to solve the CAPTCHAs being generated according to the current CAPTCHA configuration. Ideally, humans should be able to solve the CAPTCHAs with little or no difficulty (i.e., minimal inconvenience), but the adversary program should have great difficulty solving the CAPTCHAs (i.e., minimal success). As such, the method is looking to minimize human inconvenience, while simultaneously minimizing the performance and success of adversary programs. With these goals in view, the feedback loop can gather feedback data about how each group performs, and store (or otherwise "pass," transmit, make available, or otherwise convey) that feedback data for use in modifying the parameters used in a given CAPTCHA configuration.

For instance, with respect to the adversary program, this functionality can generally involve gathering information about the adversary's performance with respect to each individual character within the CAPTCHA string, and also with respect to the overall CAPTCHA string itself. For instance, consider a CAPTCHA string of "WeZd3," and consider an adversary's guess of the content of that same CAPTCHA string to be "Ws2d4." By comparing these two strings, we can see that the adversary correctly "guessed" the first (W) and fourth (d) characters in this CAPTCHA string, but incorrectly guessed the remaining characters. As such, the adversary's performance at the character level can be represented by the label [1, 0, 0, 1, 0] (where the number "1" indicates that the corresponding character in the string was guessed correctly, and the number "0" indicates that the corresponding character in the string was not guessed correctly; in other embodiments, other values and representations can be used here), and the adversary's performance with respect to the overall CAPTCHA string itself can be represented by the label "0," since the adversary failed to correctly guess the CAPTCHA string (similar to the character level representation, the number "0" indicates that the CAPTCHA string was not guessed correctly by the adversary, and the number "1" would indicate that the CAPTCHA string was guessed correctly by the adversary; in other embodiments, other values and representations can be used here). This functionality allows the method to gather relevant information about how accurately the adversary program was able to solve each individual CAPTCHA string upon which it was tested, as well as how accurately the adversary program was able to identify each individual character within each such individual CAPTCHA string. This feedback information can then be used in 210 to evaluate the adversary's performance with respect to a series of CAPTCHA strings generated from a given CAPTCHA configuration, which is part of the broader modification process that takes place in 210.

With respect to the performance of humans, this functionality can generally involve gathering information about how inconvenient and/or difficult the CAPTCHA configuration was for human users. For instance, one can assume that a human user will only "refresh" the CAPTCHA (e.g., indicate that the user would like to see a new CAPTCHA) if the CAPTCHA that the human user is currently looking at is too difficult for the human user to solve, such as might be the case, e.g., if the human user is unable to determine what actual character is represented by a given distorted character within the CAPTCHA string. As such, a decision by a human user to refresh a given CAPTCHA can be represented by the label "1," indicating that the human user experienced an inconvenience in attempting to solve the CAPTCHA. Similarly, the label "0" can be used to indicate that the human user did not have to refresh the CAPTCHA, which is assumed to mean that the human user did not experience any meaningful inconvenience (such as would cause the human user to potentially abandon his or her purchase, transactions, or other interaction with the website using the CAPTCHA) in attempting to solve the CAPTCHA. (As was the case above, in other embodiments, other values and representations can be used here.)

Additionally, the method can also log the human user's answer to each CAPTCHA challenge, which allows the system to gather character-level data regarding the user's interaction with each CAPTCHA test. For instance, consider a CAPTCHA string of "ze44t," and consider a human user who enters "zeqqt" in response to being presented with that CAPTCHA string. By comparing these two strings, we can see that the human correctly identified the first (z), second (e), and fifth (t) characters in this CAPTCHA string, but incorrectly understood the remaining characters. As such, the human user's performance at the character level can be represented by the label [0, 0, 1, 1, 0] (where the number "1" indicates that the corresponding character in the string was not correctly identified, thereby indicating that the user experienced inconvenience with respect to that character; and where the number "1" indicates that the corresponding character in the string was correctly identified, thereby indicating that the user did not experience meaningful inconvenience with respect to that character; in other embodiments, other values and representations can be used here), and the human user's performance with respect to the overall CAPTCHA string itself can be represented by the label "0," since the human user failed to correctly guess the CAPTCHA string (similar to the character level representation, the number "0" indicates that the CAPTCHA string was not guessed correctly by the human user, and the number "1" would indicate that the CAPTCHA string was guessed correctly by the human user; in other embodiments, other values and representations can be used here).

The reader will appreciate that, in the examples provided above, a "1" was used to represent a correct answer provided by the adversary program, but was also used to represent an incorrect answer provided by a human user. Likewise, a "0" was used to represent a incorrect answer provided by the adversary program, but was also used to represent an correct answer provided by a human user. In certain embodiments, the values can be selected in this manner due to the goals noted above, namely the desire to minimize adversary performance (thus, a "0," which is obviously a lesser value than a "1," is being used to represent an adversary program's failures) while simultaneously minimizing the inconvenience experienced by human users (thus, a "0," which is obviously a lesser value than a "1," is being used to represent "no inconvenience," which obviously occurs when a human does not have to refresh the CAPTCHA and when the user correctly identifies a character within a CAPTCHA). The exact numerical representations used here are primarily design choices, and these results could be represented in different manners without affecting the overall functionality of this disclosure. For instance, rather than seeking to minimize the adversary performance, the system could just as readily endeavor to maximize the adversary's difficulty in solving CAPTCHAs, in which case a "1" (or other number) could be used to represent failures (i.e., maximum difficulty) of the adversary program to correctly identify a character and/or string, and a "0" (or other number) could be used to represent successes (i.e., minimum difficulty) of the adversary program to correctly identify a character and/or string. Similarly, rather than seeking to minimize the inconvenience (or difficulty) experienced by human users, the system could just as readily endeavor to maximize the ease with which a human user could solve a given CAPTCHA, in which case a "1" (or other number) could be used to represent success (i.e., maximum ease) of a human user to correctly identify a character and/or string, and a "0" (or other number) could be used to represent failures (i.e., minimum ease) of a human user to correctly identify a character and/or string. Regardless of the exact numerical values (or Boolean values, or other value types) used to represent the information gathered, the reader should appreciate at this point that the foregoing functionality gathers relevant feedback information about the success rate of an adversary program and the inconvenience of human users (which can also be measured in terms of a success rate) in attempting to solve CAPTCHAs generated in accordance with the CAPTCHA configuration being tested.

Moreover, as used herein, a "success rate" can be calculated as follows with respect to human users and with respect to adversary programs. For instance, with respect to human users, a "success rate" can be determined in various manners, such as, e.g., determining a percentage of instances in which human users correctly solved the CAPTCHA challenge presented to the human user, and/or determining a percentage of instances in which human users correctly solved the CAPTCHA challenge presented to the human user without first refreshing any CAPTCHA challenge presented to that same human user. With respect to adversary programs, a "success rate" can also be determined in various manners, such as, e.g., determining a percentage of instances in which an adversary program correctly identifies a given character within a CAPTCHA challenge, a percentage of instances in which an adversary program correctly solves a CAPTCHA challenge taken as a whole, and/or a weighted combination of the foregoing percentages for adversary programs.

At 210, the method can then analyze the feedback information gathered in 208 in order to modify the parameterized CAPTCHA Generator (or "CAPTCHA Generator," for short), which is done with an aim towards the goals of minimizing adversary success while simultaneously minimizing human inconvenience (or difficulty). (In order to best understand the discussion provided regarding this step, the reader would do well to jump ahead and read the discussion regarding the manner in which CAPTCHAs are generated in 302, and then return here for the remainder of the discussion regarding modifying the parameterized CAPTCHA Generator by altering the distribution (or weights) of parameter values used by the parameterized CAPTCHA Generator in order to make a given CAPTCHA design less difficult and/or inconvenient for human users to solve, and/or more difficult for adversary programs to solve.) In certain embodiments, this functionality can be performed by Modification Module 122. In other embodiments, this functionality can be performed by other components of system 100. In short, the general purpose of this portion of the process is to determine if the current CAPTCHA configuration is sufficiently easy for humans to solve (i.e., minimal human inconvenience or difficulty), while simultaneously being sufficiently difficult for adversarial programs (and computers in general) to solve (i.e., minimal success by an adversary program), and to modify the distribution (or weights) of parameter values accordingly, if necessary.

In certain embodiments, method 200 can use the labels collected above in 208 in order to modify the distribution (or weights) of parameter values during the modification process of 210. For instance, and keeping in mind the goal of minimizing the adversary's success rate, if a label gathered in 208 indicates that a CAPTCHA challenge was correctly solved by the adversary, the parameters used to construct that challenge are penalized by a factor of X (where X can be any number greater than zero, and can be configured as appropriate from system to system) during the modification process. Similarly, if a label gathered in 208 indicates that a character within a CAPTCHA challenge was correctly identified by the adversary, the parameters used to construct that character can also be penalized by a factor of X during the modification process. Likewise, and keeping in mind the goal of minimizing the inconvenience and/or difficulty experienced by human users, if the CAPTCHA challenge was labelled as inconvenient to the user in 208, the parameters used to construct that challenge are penalized by a factor of Y (where Y can be any number greater than zero, and can be configured as appropriate from system to system; in any given system or embodiment, X and Y can be equal to each other, but they do not have to be equal to each other) during the modification process.

Method 200 can perform a Bayesian inference to modify the probability of one or more of the various parameter values being selected for use in a CAPTCHA challenge generated from a revised CAPTCHA configuration. As is discussed in more detail in the discussion of 302, below, the parameter values are initially randomly or pseudorandomly selected from a uniform distribution of those values or on a uniform basis, that is, by using a distribution or selection technique where each value (of any given parameter) is equally weighted, and thus each value (for a given parameter) is as equally likely to be randomly or pseudorandomly selected as any other value (for that same parameter). The Bayesian inference is applied to alter the probability distribution of these values in order to make certain values more likely to be selected in future iterations (such as, e.g., values that minimized human difficulty and/or inconvenience, or that maximized difficulty for the adversary program), and to make other values less likely to be selected in future iterations (such as, e.g., values that increased human difficulty and/or inconvenience, or that reduced difficulty for the adversary program). These new probability distributions will be used when generating future CAPTCHA challenges, at least until they are altered again following the completion of the next feedback loop 208. Moreover, although the discussion in this paragraph was provided in terms of modifying or altering a probability distribution (and/or the weight associated with each value) in order to effectuate these changes, in other embodiments, the modifications or alterations can be effectuated in a different manner. Regardless of the exact manner in which this functionality is effectuated, each iteration of parameter modification serves to increase difficulty for the adversary and/or to reduce difficulty and/or user inconvenience for human users (although, of course, if a situation arises where further modification of the parameter values would have either no effect, or an effect that was opposite of the desired goals as stated herein, then the method can also be configured to retain the previous parameter values for use in the ensuing feedback loop 208).

As is discussed in more detail below with respect to method 300, a CAPTCHA Generator can convert these stored lists into probability distributions, and the CAPTCHA Generator can then create CAPTCHA challenges by sampling from these probability distributions. As such, the results of the modification of 210 can be used in future iterations of 208 in order to create CAPTCHA challenges that are (or at least should be, pending further testing, analysis, and modification) less difficult and/or inconvenient for human users to solve, and/or more difficult for adversary programs to solve. For instance, the analysis of 210 may determine that a given value of a certain parameter results in CAPTCHAs that are too hard for humans to solve, and/or too easy for computers to solve. As a result, when the modified distributions are created, such a value may be weighted in a manner that results in that particular value being selected less often, or perhaps even not at all. For instance, distinguishing between the letter O and the number 0 ("zero") may be more difficult for humans than for computers. As a result, these characters may be minimized in, or even eliminated from, use in further CAPTCHA schemes, since their inclusion often serves to increase user difficulty and inconvenience, but may not be overly burdensome to adversary programs. Likewise, the analysis of 210 may determine that a given value of a certain parameter results in CAPTCHAs that are easy for humans to solve, and/or difficult for computers to solve. When the modified distributions are created, such a value may be weighted in a manner that results in that particular value being selected more often, since its inclusion may serve to minimize user difficulty and inconvenience, and/or to increase the difficulty (and thus lower the success rate) for adversary programs.

At 212, method 200 determines whether to continue the process, or alternatively, whether to end. In certain embodiments, the testing of each CAPTCHA configuration may be designated to be performed for a certain epoch, or period of time. In such embodiments, method 200 would determine to not to continue this process if this epoch has expired or otherwise comes to an end. In certain embodiments, method 200 can also determine to not to continue this process if an error has occurred, a forced break is encountered, a system failure occurs, and so forth. In certain embodiments, method 200 can also determine to not to continue this process for other reasons as well. If 212 evaluates in the affirmative (e.g., a determination is made to continue this process), method 200 returns control to 208 to perform further iterations of the feedback loop 208, which in the ensuing iteration will be performed by using the modified parameter distributions that were created in 210. Conversely, any determination not to continue this process ends method 200, and at least in certain embodiments, may generate an error message or other alert.

Turning next to FIG. 3, FIG. 3 is a flowchart of a method 300 illustrating various actions performed in connection with one embodiment of the systems and techniques disclosed herein. For discussion purposes, the process 300 is described with reference to elements such as those described in connection with FIG. 1A and FIG. 1B as described herein, although other models, frameworks, systems and environments may be used to implement these processes. To provide more detail, FIG. 3 is a flowchart of a process 300 that illustrates various actions that can be performed in conjunction with this disclosure, such as can generally be viewed, e.g., from the perspective of a server (such as, e.g., server 112) and/or a module or other component thereof (such as, e.g., Receiving Module 114, Storage Module 116, CAPTCHA Generation Module 118, and/or Adversary Module 120, among other components). In certain embodiments, however, process 300 may be performed by any computing device (such as, e.g., any client device 102) as described herein, and process 300 may also be performed in conjunction with one or more steps of method 200.

To provide more detail, FIG. 3 is a flowchart of a process 300 that includes various actions that can be performed to provide a feedback loop. This feedback loop can be used to test a given CAPTCHA configuration with respect to both human users and the adversary program, and to gather feedback regarding how well the human users and the adversary program were respectively able to solve the CAPTCHAs being generated according to the CAPTCHA configuration being tested. As such, FIG. 3 and method 300 provide enhanced details of 208.

In one embodiment, method 300 begins at 302, where the method generates a CAPTCHA challenge (e.g., a CAPTCHA string) in accordance with the CAPTCHA configuration being tested. In certain embodiments, this functionality can be performed by a CAPTCHA Generator (such as, e.g., CAPTCHA Generation Module 112) or other component configured to perform this functionality (collectively, "CAPTCHA Generator"). As the reader will recall, a series of parameters and related values were defined above. For instance, and as the reader will recall, various CAPTCHA parameters were defined in 204, and a table containing examples of such parameters was included with that discussion above. The instant discussion will use the example parameters provided in that table. For instance, consider the example CAPTCHA below:

As the reader will appreciate, this example CAPTCHA includes 5 characters (h, 3, 4, x, and P), each of which has been distorted in some manner from the normal "plain text" representation of those characters. To understand how each character was generated, consider the following table, which will be discussed in more detail below:

| Character Parameters for CAPTCHA String Length = 5 | | | | | |
|---|---|---|---|---|---|
| Character | h | 3 | 4 | X | P |
| Font Type | Font 1 | Font 7 | Font 4 | Font 3 | Font 9 |
| Font Size | 74 | 62 | 73 | 63 | 77 |
| X Coordinate | 21 | 60 | 93 | 129 | 169 |
| Y Coordinate | 49 | 48 | 54 | 41 | 46 |
| isHollow | 0 | 0 | 1 | 0 | 1 |
| | (Solid) | (Solid) | (Hollow) | (Solid) | (Hollow) |

As discussed in more detail above (in conjunction with 204, and otherwise), the weighted values for each parameter are stored in a table. To generate a CAPTCHA string for use in a CAPTCHA challenge, in certain embodiments, a CAPTCHA Generator uses the weight of each value to convert the stored list (for each configurable parameter of the current CAPTCHA configuration) into probability distributions. The CAPTCHA Generator creates challenges by sampling from these distributions, where sampling should be understood to mean randomly or pseudorandomly selecting a value from distribution of acceptable values for each configurable parameter (such as, e.g., the example parameters defined above). (For ease of discussion, the terms "random" and "pseudorandom" (and their cognates) will collectively be referred to by the word "random" (and its cognates) herein.) In one embodiment, during the first pass through this method, these values are selected from the distribution in a uniform manner, that is, in a manner that does not weigh any given value(s) more or less than any other values among the possible values for that parameter. As is discussed in more detail elsewhere herein, prior to at least some of the subsequent passes through this method in certain embodiments, a Bayesian inference is applied to modify (or at least modify or alter) the distribution of these values, such as, e.g., by weighing one or more parameter values more or less than other parameter values, and/or by adding or removing possible values for a given parameter. As such, in future iterations, the CAPTCHA Generator can then select future values from the modified distribution, which can increase and/or decrease (or even eliminate) the likelihood of certain values being selected, which in turn improves the effectiveness and acceptability of the CAPTCHAs with respect to the goals stated elsewhere herein (e.g., maximizing difficulty for an adversary program and minimizing inconvenience for a human user). Nevertheless, and regardless of whether the parameter values are selected from a uniform or modified distribution, once the value for each parameter is selected, the CAPTCHA is generated in the same basic manner from that point forward.

For instance, and with reference to the parameters and value ranges provided above, a CAPTCHA Generator can randomly determine the length of the CAPTCHA string to be generated by selecting a value from among the range of available values for the string length parameter. (As was noted above, and as is the case with each value selected in this discussion, these values are randomly selected, on either a uniform or modified basis, from among the range of acceptable values that were previously defined for each parameter.) In this example, the randomly determined string length is 5, which indicates that the CAPTCHA string to be generated in this iteration will include 5 characters. In other iterations, other string lengths (of length=n, where n is any whole number greater than zero and within the range defined in the CAPTCHA parameters for any given CAPTCHA design) are possible, in accordance with the parameters defined in the 204.

Further in view of the table above, the CAPTCHA Generator randomly select the respective character to be used in each of the n positions in the string (in this example, n=5) from among the available values for the character parameter. In this example, the selected characters are h, 3, 4, X, and P. The CAPTCHA Generator can also determine various parameters regarding the manner in which each of those characters is to be displayed in the CAPTCHA string, which in certain embodiments can be performed in the manner described below:

For instance, the CAPTCHA Generator can randomly select the font type (from among the available values for the font type parameter) to be used for each of those characters, which in the current example is represented by Font 1, Font 7, Font 4, Font 3, and Font 9, respectively. In practice, the available fonts can be stored in an array of fonts, and the number provided here can be an index into that array. In other embodiments, the specific font names can be stored and referenced in a different manner. The CAPTCHA Generator can also randomly select the font size (from among the available values for the font size parameter) to be used for each of those characters, which in the current example is 74, 62, 73, 63, and 77, respectively. (The reader will note that each of these font sizes are within the range of available font sizes defined in the example CAPTCHA parameters provided above, namely, the range of 40 to 80.)

Similarly, the CAPTCHA Generator can also determine an x-coordinate for each character. In certain embodiments, the x-coordinate can be determined by randomly selecting an x-offset value (from among the available values for the x-offset parameter) for each character, and adding that x-offset value to the x-coordinate at which each character would otherwise be placed if all of the characters were equally spaced. In the current example, this results in x-coordinates of 21, 60, 93, 129, and 169, respectively. The CAPTCHA Generator can also determine a y-coordinate for each character. In certain embodiments, the y-coordinate can be determined by randomly selecting a y-offset value (from among the available values for the y-offset parameter) for each character, and using that y-offset along with other information about the character (such as, e.g., the font type and font size of the character) to determine the y-coordinate at which each character is to be placed, which in the current example results in y-coordinates of 21, 60, 93, 129, and 169, respectively.

The CAPTCHA Generator can also determine whether each character will be displayed as a "solid" character or a "hollow" character, which can be determined by randomly selecting from among the available values for this parameter (which, in this case, only includes two values: 1, for solid; and 0, for hollow). In the current example, this results in the h, 3, and X characters being displayed as solid characters, and the 4 and P characters being displayed at hollow characters. Moreover, although not expressly shown in the table above, the CAPTCHA Generator can also randomly determine the extent to which each character will be "skewed," or slanted, when that character is displayed in the CAPTCHA string. In other embodiments, other parameters and values are also possible, such as, e.g., determining whether each character is displayed in two-dimensions or three-dimensions, a brightness of each character, a sharpness of each character, a color of each character, and so forth, among other such examples.

As a result of determining the appropriate values of each of the configurable parameters defined for a given embodiment, a CAPTCHA Generator can combine the selected characters, as modified in accordance with a randomly selected value for each configurable parameter, and generate an image containing those modified characters as a CAPTCHA string to be used in a CAPTCHA challenge. (If the reader paused at 210 to read the discussion related to how CAPTCHAs are generated in 302, the reader should now return to the remainder of the discussion 210, and the ensuing discussion of the remainder of method 200, at this point.)

At 304, a CAPTCHA that was generated in 302 is displayed to a human user, such as, e.g., on a portion of an e-commerce or other website. At 306, a CAPTCHA that was generated in 302 is displayed (or otherwise presented) to an adversary program, such as was defined in 206. (In practice, these do not have to be the same exact CAPTCHA strings, but should be generated according to the same version of a CAPTCHA configuration.) At 308, feedback is received with respect to the CAPTCHA challenge that was presented to a human user in 304, such as, e.g., the types of feedback discussed in more detail in the discussion of 208, above. For example, this feedback can include information such as, e.g., whether a human user chose to "refresh" the CAPTCHA, whether the human user correctly or incorrectly identified each individual character, and/or whether the human user correctly solved the CAPTCHA as a whole. At 310, feedback is received with respect to a CAPTCHA challenge that was presented to an adversary program in 306, such as, e.g., the types of feedback discussed in more detail in the discussion of 208, above. For example, this feedback can include information such as, e.g., whether the adversary program correctly or incorrectly identified each individual character, and/or whether the adversary program correctly solved the CAPTCHA as a whole. In certain embodiments, this feedback can be received by passing the CAPTCHA image through an adversary optical character recognition ("OCR") model, which can be a component of the adversary program. (In certain embodiments, the feedback received at 308 and 310 can be received by a receiving module, such as, e.g., Receiving Module 114.) At 312, the feedback received at 308 is stored in a memory for later processing, such as by 210. At 314, the feedback received at 310 is stored in a memory for later processing, such as by 210. (In certain embodiments, the storage of 312 and 314 can be received by a storage module, such as, e.g., Storage Module 116.) Although these two paths (302 to 304 to 308 to 312, and 302 to 306 to 310 to 314) are shown in parallel in FIG. 3, in practice they can be performed at separate times from each other. For instance, the right-hand path, which involves the adversary, can obviously be performed many times in a short amount of time, since this path is primarily dependent upon the speed at which at the adversary program can operate, and does not necessarily require waiting for human users to navigate to a webpage that includes the CAPTCHA. Conversely, the left-hand path, which involves human users, may be performed less frequently than the right-hand path, since the left-hand path generally requires, e.g., a human user to navigate to a webpage page that includes a CAPTCHA challenge consistent with this functionality. Moreover, as noted above, the same CAPTCHA strings do not have to be (but can be) shown to both the human users (collectively) and the adversary program, although the CAPTCHA strings shown to each group should be generated in light of the same set of parameters and same distribution of associated values. However, by looping through this method multiple times, sufficient data can be gathered with respect to both human users (collectively) and the adversary program to allow for the analysis performed by 210.

At 316, method 300 determines whether to break the feedback loop. In certain embodiments, the testing of each CAPTCHA configuration may be designated to be performed for a certain epoch, or period of time. In such embodiments, method 300 would determine to break the feedback loop if this epoch has expired or otherwise comes to an end. In certain embodiments, method 300 can also break the feedback loop for other reasons, such as when a certain number of tests have been performed and sufficient feedback data has been gathered. In certain embodiments, method 300 can also break the feedback loop if a threshold value is exceeded (particularly after a sufficient number of tests) indicating either that the given CAPTCHA test is too hard for humans (which can cost a website lost revenue or other desirable interactions with humans, if humans abandon whatever process they are performing due to the difficulty of the CAPTCHA) or too easy for the adversary (in which case website security may be at risk, and/or other concerns may be present). In certain embodiments, method 300 can also break the feedback loop if an error has occurred, a forced break is encountered, a system failure occurs, and so forth. In certain embodiments, method 300 can also break the feedback loop for other reasons as well. Any determination to break the feedback loop ends method 300, and at least in certain embodiments, returns control to method 200 to perform the analysis and modification of the parameter distributions in 210. However, if 316 evaluates in the negative (e.g., a determination not to break the feedback loop at the current moment), method 300 returns control to 302 to perform further iterations of method 300, gathering more feedback data in the process.

FIG. 4 illustrates an example configuration of a computing device 400 that can be used to implement the systems and techniques described herein, such as, for example, client devices 102, server 112, or another component illustrated in FIG. 1A and/or FIG. 1B. The computing device 400 may include one or more processors 402, a memory 404, communication interfaces 406, a display device 408, other input/output (I/O) devices 410, and one or more mass storage devices 412, configured to communicate with each other, such as via one or more system buses 414 or other suitable connection. While a single bus 414 is illustrated for ease of understanding, it should understood that the system bus 414 may include multiple buses, such as memory device buses, storage device buses, power buses, video signal buses, and the like.

The processor(s) 402 are one or more hardware devices that may include a single processing unit or a number of processing units, all of which may include single or multiple computing units or multiple cores. The processor(s) 402 may be implemented as one or more microprocessors, microcomputers, microcontrollers, digital signal processors, central processing units, graphics processing units, state machines, logic circuitries, and/or any hardware devices that manipulate signals based on operational instructions. Among other capabilities, the processor(s) 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processor 402 to perform the various functions described herein. For example, memory 404 may include both volatile memory and non-volatile memory (e.g., random access memory (RAM), read-only memory (ROM), or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein, and may be a media capable of storing computer-readable, processor-executable program instructions as computer program code that can be executed by the processor 402 as a particular machine configured for carrying out the operations and functions described in the implementations herein.

The computing device 400 may also include one or more communication interfaces 406 for exchanging data via the network 108 with network connections 110. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 406 can also provide communication with external storage (not shown), such as in a storage array, network attached storage, storage area network, or the like. A display device 408, such as a monitor may be included in some implementations for displaying information and images to users. Other I/O devices 410 may be devices that receive various inputs from a user and provide various outputs to the user, and may include a keyboard, a remote controller, a mouse, a printer, audio input/output devices, and so forth.

The computer storage media, such as memory 404 and mass storage devices 412, may be used to store software and data. For example, the computer storage media may be used to store one or more Applications 104, one or more CAPTCHA Modules 106, a Receiving Module 114, a Storage Module 116, a CAPTCHA Generation Module 118, an Adversary Module 120, an Analysis Module 122, an operating system 416, other applications 418, and other data 420.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module,"

"mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one embodiment," "this embodiment," "these embodiment," "certain embodiments," or "some embodiment," means that a particular feature, structure, or characteristic described is included in at least one embodiment, and the appearances of these phrases in various places in the specification are not necessarily all referring to the same embodiment.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    defining a CAPTCHA generator, wherein
        a CAPTCHA is a Completely Automated Public Turing tests to tell Computers and Humans Apart, and
        the CAPTCHA generator is configured to generate CAPTCHA challenges by using at least a first parameter and a first plurality of values associated with the first parameter;
    defining an adversary program, wherein
        the adversary program is configured to automatically attempt to solve the CAPTCHA challenges;
    performing a first feedback loop comprising:
        generating a first plurality of CAPTCHA challenges,
        receiving feedback from a group of human users with respect to a first subset of the first plurality of CAPTCHA challenges, and
        receiving feedback from the adversary program with respect to a second subset of the first plurality of CAPTCHA challenges; and
    modifying a weight associated with a first value among the plurality of values, to determine a modified weight associated with the first value, wherein
        the modified weight changes how often the associated value will be used in generating a subsequent plurality of CAPTCHA challenges,
        the modifying is based, at least in part, on the feedback from the group of human users and the feedback from the adversary program, and
        the modifying is configured to accomplish at least one of:
            increasing a first success rate associated with human users solving the CAPTCHA challenges, and
            decreasing a second success rate associated with the adversary program solving the CAPTCHA challenges.

2. The method of claim 1, wherein
each CAPTCHA challenge of the plurality of CAPTCHA challenges is generated, at least in part, by randomly selecting a value from among the first plurality of values.

3. The method of claim 1, further comprising:
subsequent to the modifying, performing a second feedback loop, wherein
    the second feedback loop comprises generating a second plurality of CAPTCHA challenges, and
    the second plurality of CAPTCHA challenges are generated, at least in part, by using the modified weight to determine how often the associated value is used in generating the second plurality of CAPTCHA challenges.

4. The method of claim 1, wherein
the modifying comprises applying a Bayesian inference to the feedback from the group of human users and the feedback from the adversary program in order to determine the weight.

5. The method of claim 1, wherein:
the modifying creates a modified distribution of the first plurality of values associated with the first parameter.

6. The method of claim 1, wherein
the second success rate is measured by determining a first rate at which the adversary program correctly identified individual characters within the CAPTCHA challenges, and a second rate at which the adversary program correctly solved the CAPTCHA challenges.

7. The method of claim 1, wherein
the modifying results in less inconvenience for human users than was the case prior to the modifying, wherein inconvenience is measured by determining how often human users refreshed CAPTCHA challenges and how often human users incorrectly responded to CAPTCHA challenges.

8. The method of claim 1, wherein:
the first parameter, the first plurality of values associated with the first parameter, and the weight associated with the first value are stored in a table, and
the parameterized CAPTCHA generator uses information in the table to generate CAPTCHA challenges.

9. A computing device comprising:
one or more processors; and
one or more non-transitory computer-readable storage media to store instructions executable by the one or more processors to perform operations comprising:
    defining a CAPTCHA generator, wherein
        a CAPTCHA is a Completely Automated Public Turing tests to tell Computers and Humans Apart, and
        the CAPTCHA generator is configured to generate CAPTCHA challenges by using at least a first parameter and a first plurality of values associated with the first parameter;
    defining an adversary program, wherein
        the adversary program is configured to automatically attempt to solve the CAPTCHA challenges;
    performing a first feedback loop comprising:
        generating a first plurality of CAPTCHA challenges,
        receiving feedback from a group of human users with respect to a first subset of the first plurality of CAPTCHA challenges, and receiving feedback from the adversary program with respect to a second subset of the first plurality of CAPTCHA challenges; and modifying a weight associated with a first value among the plurality of values, to determine a modified weight associated with the first value, wherein the modified weight changes how often the associated value will be used in generating a subsequent plurality of CAPTCHA challenges, the modifying is based, at least in part, on the feedback from the group of human users and the feedback from the adversary program, and the modifying is configured to accomplish at least one of:

increasing a first success rate associated with human users solving the CAPTCHA challenges, and decreasing a second success rate associated with the adversary program solving the CAPTCHA challenges.

10. The computing device of claim 9, wherein each CAPTCHA challenge of the plurality of CAPTCHA challenges is generated, at least in part, by randomly selecting a value from among the first plurality of values.

11. The computing device of claim 9, wherein the operations further comprise:

subsequent to the modifying, performing a second feedback loop, wherein the second feedback loop comprises generating a second plurality of CAPTCHA challenges, and the second plurality of CAPTCHA challenges are generated, at least in part, by using the modified weight to determine how often the associated value is used in generating the second plurality of CAPTCHA challenges.

12. The computing device of claim 9, wherein the modifying comprises applying a Bayesian inference to the feedback from the group of human users and the feedback from the adversary program in order to determine the weight.

13. The computing device of claim 9, wherein the modifying creates a modified distribution of the first plurality of values associated with the first parameter.

14. The computing device of claim 9, wherein the second success rate is measured by determining a first rate at which the adversary program correctly identified individual characters within the CAPTCHA challenges, and a second rate at which the adversary program correctly solved the CAPTCHA challenges; and the modifying results in less inconvenience for human users than was the case prior to the modifying, wherein inconvenience is measured by determining how often human users refreshed CAPTCHA challenges and how often human users incorrectly responded to CAPTCHA challenges.

15. One or more non-transitory computer-readable storage media to store instructions executable by one or more processors to perform operations comprising:

defining a CAPTCHA generator, wherein a CAPTCHA is a Completely Automated Public Turing tests to tell Computers and Humans Apart, and the CAPTCHA generator is configured to generate CAPTCHA challenges by using at least a first parameter and a first plurality of values associated with the first parameter;

defining an adversary program, wherein the adversary program is configured to automatically attempt to solve the CAPTCHA challenges;

performing a first feedback loop comprising:

generating a first plurality of CAPTCHA challenges, receiving feedback from a group of human users with respect to a first subset of the first plurality of CAPTCHA challenges, and receiving feedback from the adversary program with respect to a second subset of the first plurality of CAPTCHA challenges; and modifying a weight associated with a first value among the plurality of values, to determine a modified weight associated with the first value, wherein the modified weight changes how often the associated value will be used in generating a subsequent plurality of CAPTCHA challenges, the modifying is based, at least in part, on the feedback from the group of human users and the feedback from the adversary program, and the modifying is configured to accomplish at least one of:

increasing a first success rate associated with human users solving the CAPTCHA challenges, and decreasing a second success rate associated with the adversary program solving the CAPTCHA challenges.

16. The one or more non-transitory computer-readable storage media of claim 15, wherein each CAPTCHA challenge of the plurality of CAPTCHA challenges is generated, at least in part, by randomly selecting a value from among the first plurality of values.

17. The one or more non-transitory computer-readable storage media of claim 15, wherein the first parameter, the first plurality of values associated with the first parameter, and the weight associated with the first value are stored in a table, and the parameterized CAPTCHA generator uses information in the table to generate CAPTCHA challenges.

18. The one or more non-transitory computer-readable storage media of claim 15, wherein the operations further comprise:

subsequent to the modifying, performing a second feedback loop, wherein the second feedback loop comprises generating a second plurality of CAPTCHA challenges, and the second plurality of CAPTCHA challenges are generated, at least in part, by using the modified weight to determine how often the associated value is used in generating the second plurality of CAPTCHA challenges.

19. The one or more non-transitory computer-readable storage media of claim 18, wherein the modifying comprises applying a Bayesian inference to the feedback from the group of human users and the feedback from the adversary program in order to determine the weight.

20. The one or more non-transitory computer-readable storage media of claim 19, wherein the modifying creates a modified distribution of the first plurality of values associated with the first parameter.

* * * * *